(12) United States Patent
Kim et al.

(10) Patent No.: US 10,432,381 B2
(45) Date of Patent: Oct. 1, 2019

(54) METHOD FOR TRANSMITTING AND RECEIVING MULTIPLE USER BLOCK ACKNOWLEDGEMENT FRAME IN WIRELESS LAN SYSTEM, AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 173 days.

(21) Appl. No.: 15/517,911

(22) PCT Filed: Oct. 27, 2015

(86) PCT No.: PCT/KR2015/011367
§ 371 (c)(1),
(2) Date: Apr. 7, 2017

(87) PCT Pub. No.: WO2016/068572
PCT Pub. Date: Jun. 6, 2016

(65) Prior Publication Data
US 2017/0310448 A1      Oct. 26, 2017

Related U.S. Application Data

(60) Provisional application No. 62/068,771, filed on Oct. 27, 2014, provisional application No. 62/100,915, (Continued)

(51) Int. Cl.
*H04L 5/00* (2006.01)
*H04L 1/00* (2006.01)
(Continued)

(52) U.S. Cl.
CPC .............. *H04L 5/0055* (2013.01); *H04L 1/00* (2013.01); *H04L 1/16* (2013.01); *H04L 1/1614* (2013.01);
(Continued)

(58) Field of Classification Search
CPC ..................................................... H04L 5/0055
See application file for complete search history.

(56) References Cited

U.S. PATENT DOCUMENTS

| 8,116,249 B2 | 2/2012 | Shiba et al. |
| 2009/0147719 A1 | 6/2009 | Kang |

(Continued)

FOREIGN PATENT DOCUMENTS

| CN | 1943157 | 4/2007 |
| CN | 103957087 | 7/2014 |

(Continued)

OTHER PUBLICATIONS

PCT International Application No. PCT/KR2015/011367, Written Opinion of the International Searching Authority dated Feb. 12, 2016, 21 pages.

(Continued)

*Primary Examiner* — Shukri Taha
(74) *Attorney, Agent, or Firm* — Lee, Hong, Degerman, Kang & Waimey PC

(57) ABSTRACT

The present specification relates to a method of an access point (AP) transmitting a block acknowledgement (ACK) signal with respect to transmission data of a plurality of stations (STA) in a wireless LAN (WLAN) system, and an apparatus therefor. To this end, an AP transmits a multi-STA BA frame with respect to data received from the plurality of STA, wherein the multi-STA BA frame includes a MAC header field, a BA control field and a BA information field. In this regard, the BA information field may include: AID (Continued)

information with respect to one or more STA to which ACK/NACK is transmitted from the plurality of STA; and an individual information field including BA indicator information that indicates whether the BA information field includes one or more of a block ACK bitmap sub-field and a starting sequence control sub-field.

13 Claims, 12 Drawing Sheets

Related U.S. Application Data filed on Jan. 8, 2015, provisional application No. 62/109,623, filed on Jan. 30, 2015, provisional application No. 62/110,611, filed on Feb. 2, 2015, provisional application No. 62/111,021, filed on Feb. 2, 2015, provisional application No. 62/112,600, filed on Feb. 5, 2015, provisional application No. 62/185,741, filed on Jun. 29, 2015.

(51) Int. Cl.
*H04L 1/16* (2006.01)
*H04W 72/04* (2009.01)
*H04W 72/12* (2009.01)
*H04W 84/12* (2009.01)

(52) U.S. Cl.
CPC ......... *H04W 72/042* (2013.01); *H04L 1/1635* (2013.01); *H04L 1/1685* (2013.01); *H04L 2001/0093* (2013.01); *H04W 72/121* (2013.01); *H04W 84/12* (2013.01)

(56) References Cited

U.S. PATENT DOCUMENTS

| | | | |
|---|---|---|---|
| 2010/0050041 | A1 | 2/2010 | Chang et al. |
| 2011/0096710 | A1 | 4/2011 | Liu et al. |
| 2011/0235593 | A1 | 9/2011 | Gong et al. |
| 2011/0286377 | A1* | 11/2011 | Sampath ............... H04L 1/1671 370/312 |
| 2012/0314697 | A1 | 12/2012 | Noh et al. |
| 2013/0223210 | A1 | 8/2013 | Asterjadhi et al. |
| 2013/0301569 | A1* | 11/2013 | Wang .................... H04L 5/0055 370/329 |
| 2013/0310569 | A1 | 11/2013 | Nulwala et al. |
| 2014/0254424 | A1 | 9/2014 | Gao et al. |
| 2015/0092697 | A1* | 4/2015 | Yeow .................... H04L 1/0025 370/329 |

FOREIGN PATENT DOCUMENTS

| | | |
|---|---|---|
| KR | 1020110095098 | 9/2011 |
| WO | 2014014577 | 1/2014 |
| WO | 2016032007 | 3/2016 |

OTHER PUBLICATIONS

European Patent Office Application Serial No. 15795101.3, Search Report dated May 17, 2018, 10 pages.
The State Intellectual Property Office of the People's Republic of China Application Serial No. 201580056549.5, Office Action dated Jul. 18, 2019, 9 pages.

* cited by examiner

METHOD FOR TRANSMITTING AND RECEIVING MULTIPLE USER BLOCK ACKNOWLEDGEMENT FRAME IN WIRELESS LAN SYSTEM, AND APPARATUS THEREFOR

CROSS-REFERENCE TO RELATED APPLICATIONS

This application is the National Stage filing under 35 U.S.C. 371 of International Application No. PCT/KR2015/011367, filed on Oct. 27, 2015, which claims the benefit of U.S. Provisional Application No. 62/068,771, filed on Oct. 27, 2014, 62/100,915, filed on Jan. 8, 2015, 62/109,623, filed on Jan. 30, 2015, 62/110,611, filed on Feb. 2, 2015, 62/111,021, filed on Feb. 2, 2015, 62/112,600, filed on Feb. 5, 2015 and 62/185,741, filed on Jun. 29, 2015, the contents of which are all hereby incorporated by reference herein in their entirety.

TECHNICAL FIELD

The following description relates to a method for transmitting and receiving a multi-user or multi-station (STA) block acknowledgement (Ack) frame in a wireless local area network system and an apparatus therefor.

BACKGROUND ART

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

In the IEEE 802.11ax standards, an Uplink (UL) Orthogonal Frequency Division Multiple Access (OFDMA) transmission scheme and a UL Multi-User (MU) transmission scheme will be used. Then, an Access Point (AP) may receive UL MU frames from a plurality of STAs at the same transmission opportunity and needs to transmit an Acknowledgement (ACK) frame in response to the UL MU frames.

In this case, efficient transmission of an ACK signal to a plurality of STAs through a Block ACK (BA) frame may be considered. However, overhead may be problematic due to an increased size of an MU BA frame for a plurality of STAs.

Hereinafter, a method and apparatus for efficiently transmitting a BA frame by minimizing overhead in a UL MU transmission situation will be described.

Technical Solution

An aspect of the present invention devised to solve the above-described problems proposes a method for transmitting a Block Acknowledgement (ACK) (BA) signal for transmission data of a plurality of Stations (STAs) by an Access Point (AP) in a Wireless Local Area Network (WLAN) system. The method includes receiving data from the plurality of STAs, and transmitting a multi-STA BA frame for the data received from the plurality of STAs, wherein the multi-STA BA frame includes a Media Access Control (MAC) header field, a BA control field, and a BA information field, and wherein the BA information field includes an individual information field including Association Identifier (AID) information for one or more STAs, to which ACK/Negative ACK (NACK) is directed, among the plurality of STAs and BA indicator information indicating whether the BA information field includes one or more of a block ACK bitmap subfield and a starting sequence control subfield.

Another aspect of the present invention proposes a method for receiving a Block Acknowledgement (ACK) (BA) signal from an Access Point (AP) by a Station (STA) in a Wireless Local Area Network (WLAN) system. The method includes transmitting data to the AP, and receiving an ACK signal for the data through a multi-STA BA frame from the AP, wherein the multi-STA BA frame includes a Media Access Control (MAC) header field, a BA control field, and a BA information field, and wherein the BA information field includes an individual information field including Association Identifier (AID) information for one or more STAs, to which ACK/Negative ACK (NACK) is directed, among the plurality of STAs and BA indicator information indicating whether the BA information field includes one or more of a block ACK bitmap subfield and a starting sequence control subfield.

Another aspect of the present invention proposes an Access Point (AP) for transmitting a Block Acknowledgement (ACK) (BA) signal for transmission data of a plurality of Stations (STAs) in a Wireless Local Area Network (WLAN) system. The AP includes a transceiver configured to receive data from the plurality of STAs and to transmit a multi-STA BA frame for the data received from the plurality of STAs, and a processor connected to the transceiver and configured to process the data and to form the multi-STA BA frame, wherein the processor is configured to cause the multi-STA BA frame to include a Media Access Control (MAC) header field, a BA control field, and a BA information field, and wherein the BA information field includes an individual information field including Association Identifier (AID) information for one or more STAs, to which ACK/Negative ACK (NACK) is directed, among the plurality of STAs and BA indicator information indicating whether the BA Information field includes one or more of a block ACK bitmap subfield and a starting sequence control subfield.

Another aspect of the present invention proposes a Station (STA) for receiving a Block Acknowledgement (ACK) (BA) signal from an Access Point (AP) in a Wireless Local Area Network (WLAN) system. The STA includes a transceiver configured to transmit data to the AP and to receive an ACK signal for the data through a multi-STA BA frame from the AP, and a processor connected to the transceiver and configured to configure the data and to process the multi-STA BA frame, wherein the multi-STA BA frame includes a Media Access Control (MAC) header field, a BA control field, and a BA information field, and wherein the BA information field includes an individual information field including Association Identifier (AID) information for one or more STAs, to which ACK/Negative ACK (NACK) is directed, among the plurality of STAs and BA indicator information indicating whether the BA information field includes one or more of a block ACK bitmap subfield and a starting sequence control subfield.

The individual information field may be a per Traffic Identifier (TID) information field or a per AID information field.

If the BA indicator information of the individual information field indicates a first value, the BA information field may not include the block ACK bitmap subfield and the starting sequence control subfield and the BA information field may indicate ACK for all MAC Packet Data Units (MPDUs) in a Physical Layer Convergence Protocol (PLCP) Packet Data Unit (PPDU) received from an STA having an AID included in the AID information.

If the BA indicator information of the individual information field indicates a second value, the BA information field may include the starting sequence control subfield and does not include the block ACK bitmap subfield and the BA information field may indicate ACK for all MPDUs after an MPDU corresponding to the starting sequence control subfield among a plurality of MPDUs in a PPDU received from an STA having an AID included in the AID information.

If the BA indicator information of the individual information field indicates a third value, the BA Information field may include both the block ACK bitmap subfield and the starting sequence control subfield.

The multi-STA BA frame may be a multi-TID block Ack frame including a multi-TID subfield in the BA control field.

The BA information field may include a plurality of BA information fields and each of the plurality of BA Information fields may indicate ACK for different STAs.

The individual information field may have a length of 12 bits in which a first bit B0 to an 11th bit B10 indicate the AID information and the 12th bit B11 indicates the BA indicator information.

The data received from the plurality of STAs may have an uplink Multi-User (MU) PPDU format and a PPDU received from a specific STA may include a single MPDU or a plurality of MPDUs.

An uplink (UL) MU PPDU received from the plurality of STAs may be correspondingly received as the AP transmits a trigger frame to the plurality of STAs.

Advantageous Effects

According to the present invention as described above, an AP can efficiently transmit an ACK signal to a plurality of STAs by minimizing overhead in a UL MU transmission situation.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method for efficiently utilizing a channel having a wide bandwidth in a WLAN system and an apparatus therefor. To this end, a WLAN system to which the present invention is applicable will be described first in detail.

Figure 1:
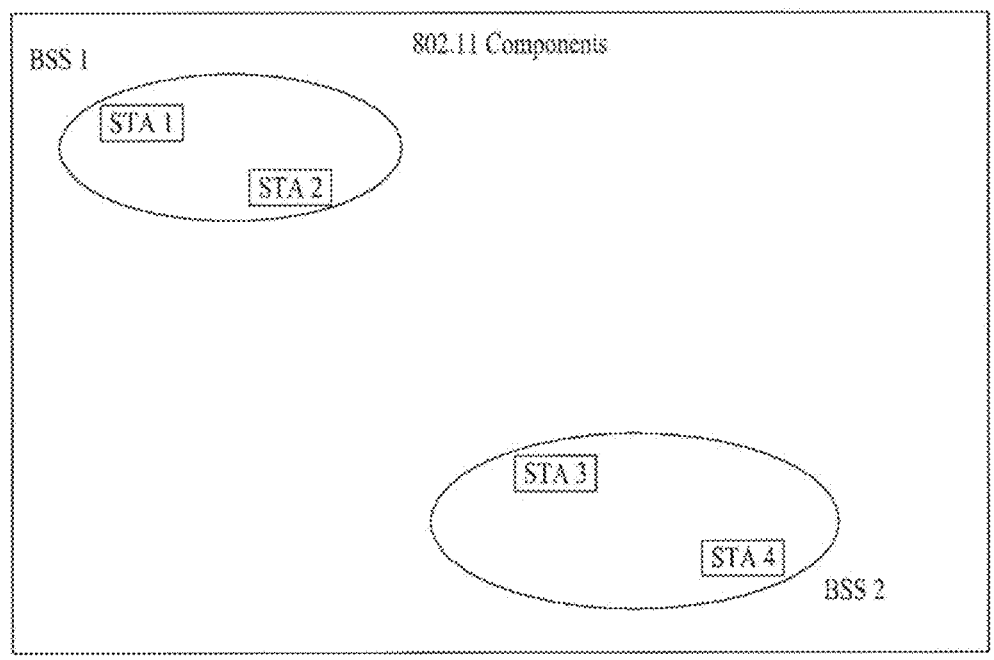
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/ Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
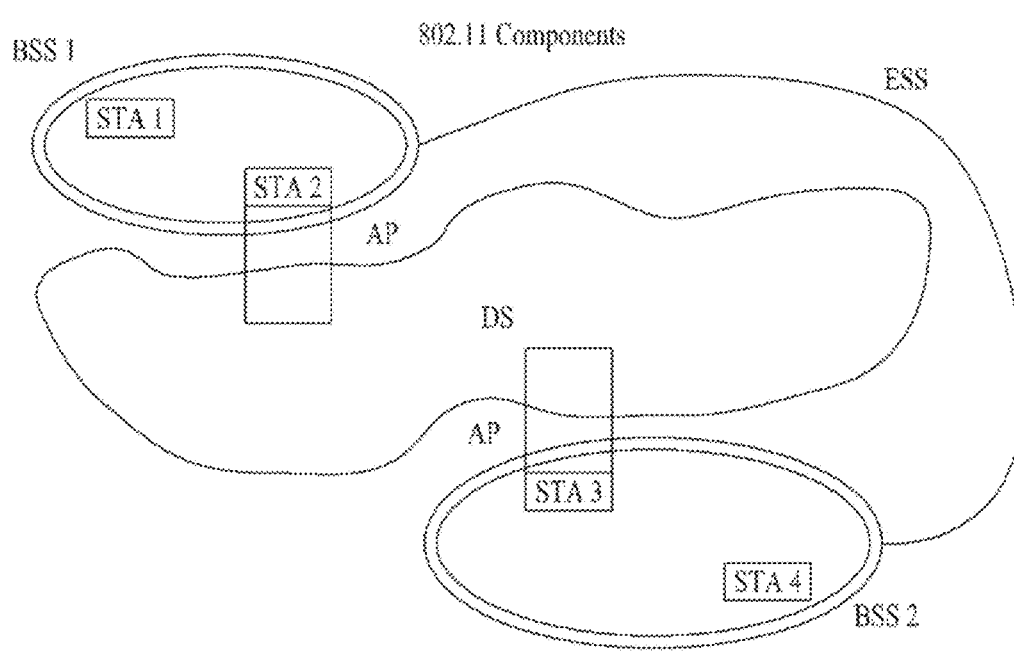
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above description, a block Ack scheme in a WLAN system will be described hereinbelow.

A block Ack mechanism is a scheme of improving channel efficiency by aggregating and then transmitting a plurality of Acks in one frame. There are two types of block Ack mechanism schemes: an immediate Ack scheme and a delayed Ack scheme. The immediate Ack scheme may be suitable for high-bandwidth, low-latency traffic transmission, whereas the delayed Ack scheme is favorable for applications that can tolerate latency. Unless particularly specified otherwise in the below description, an STA that transmits data using the block Ack mechanism is referred to as an originator and an STA that receives the data using the block Ack mechanism is referred to as a recipient.

Figure 3:
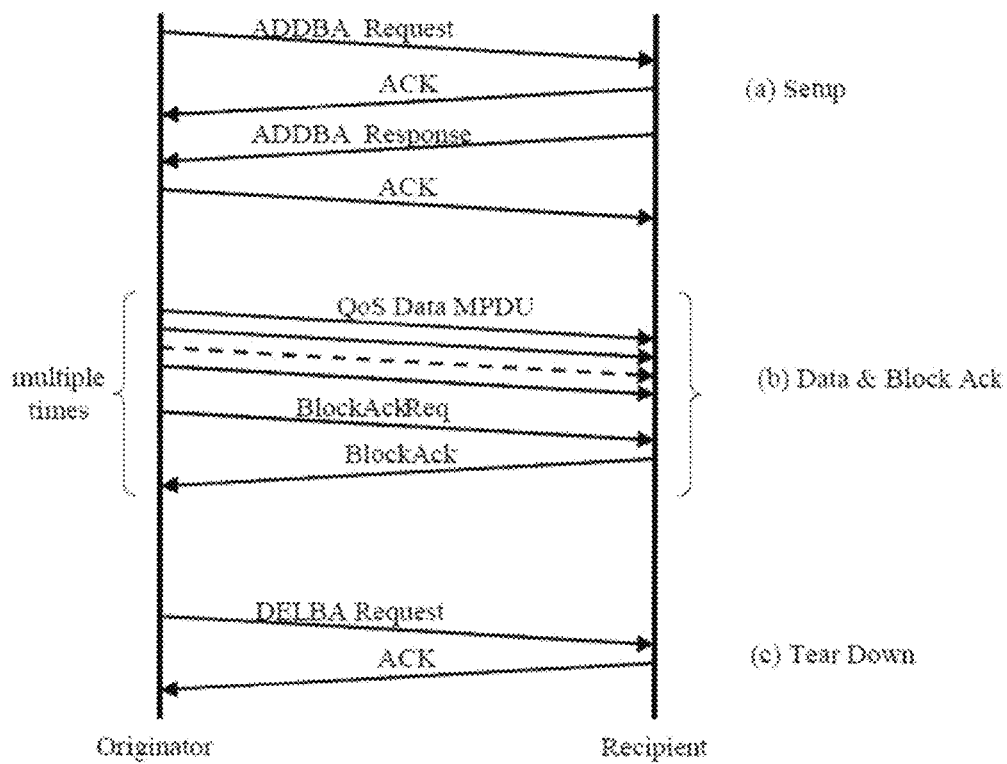
FIG. 3 is a diagram illustrating a block Ack mechanism used in a WLAN system.

FIG. 3 is a diagram illustrating a block Ack mechanism used in a WLAN system.

The block Ack mechanism may be initialized by an exchange of Add Block Acknowledgment (ADDBA) request/response frames as illustrated in FIG. 3 ((a) Setup step). After the block Ack mechanism is initialized, a block of Quality of Service (QoS) data frames may be transmitted by an originator to a recipient. Such a block may be started within a polled Transmission Opportunity (TXOP) or by winning Enhanced Distributed Channel Access (EDCA) contention. The number of frames in the block may be limited. MAC Packet Data Units (MPDUs) in the block of frames may be acknowledged by a BlockAck frame, which is requested by a BlockAckReq frame ((b) Data & Block Ack step).

When the originator has no data to transmit and a final block Ack exchange is completed, the originator may end the block Ack mechanism by transmitting a Delete Block Acknowledgment (DELBA) frame to the recipient. Upon receiving the DELBA frame, the recipient may release all resources allocated for Block Ack transfer ((c) Tear Down step).

Figure 4:
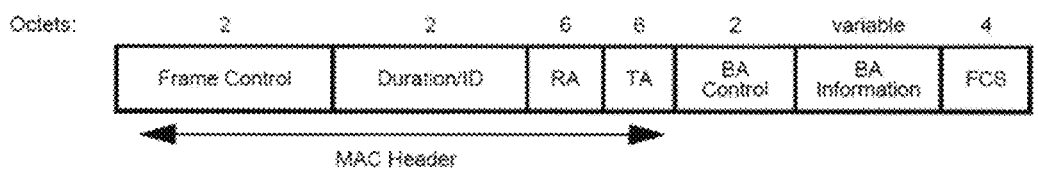
FIG. 4 is a diagram illustrating a basic configuration of a block Ack frame.

FIG. 4 is a diagram illustrating a basic configuration of a block Ack frame.

The block Ack frame may include a MAC Header field, a Block Ack (BA) Control field, and a BA Information field. The MAC Header field may include a Frame Control field, a Duration/ID field, an RA field, and a TA field. Herein, the RA field represents an address of a receiver STA and the TA field represents an address of a transmitter STA.

Figure 5:
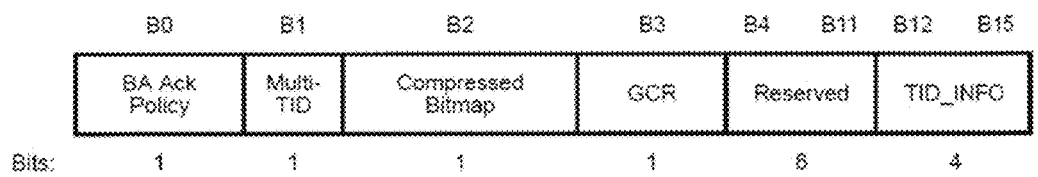
FIG. 5 is a diagram illustrating a detailed configuration of a BA Control field in FIG. 4.

FIG. 5 is a diagram illustrating a detailed configuration of the BA Control field in FIG. 4.

A value of a BA Ack Policy subfield in the BA Control field may have the meaning shown in Table 1 below.

TABLE 1

| Value | Meaning |
|---|---|
| 0 | Normal Acknowledgement. The BA Ack Policy subfield is set to this value when the sender requires immediate acknowledgment. The addressee returns an Ack frame. The value 0 is not used for data sent under HT-delayed Block Ack during a PSMP sequence. The value 0 is not used in frames transmitted by DMG STAs. |
| 1 | No Acknowledgement. The addressee sends no immediate response upon receipt of the frame. The BA Ack Policy is set to this value when the sender does not require immediate acknowledgment. The value 1 is not used in a Basic BlockAck frame outside a PSMP sequence. The value 1 is not used in an Multi-TID BlockAck frame. |

Meanwhile, Multi-Traffic Identifier (TID), Compressed Bitmap, and GCR subfields in the BA Control field may determine possible BlockAck frame variants according to the following regulation.

TABLE 21

| Multi-TID subfield value | Compressed Bitmap subfield value | GCR subfield value | BlockAck frame variant |
|---|---|---|---|
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |
| 0 | 0 | 1 | Reserved |
| 0 | 1 | 1 | GCR BlockAck |
| 1 | 0 | 1 | Reserved |
| 1 | 1 | 1 | Reserved |

Figure 6:
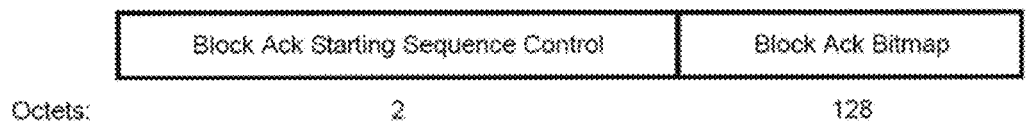
FIG. 6 is a diagram illustrating a detailed configuration of a BA Information field in FIG. 4.
Figure 7:
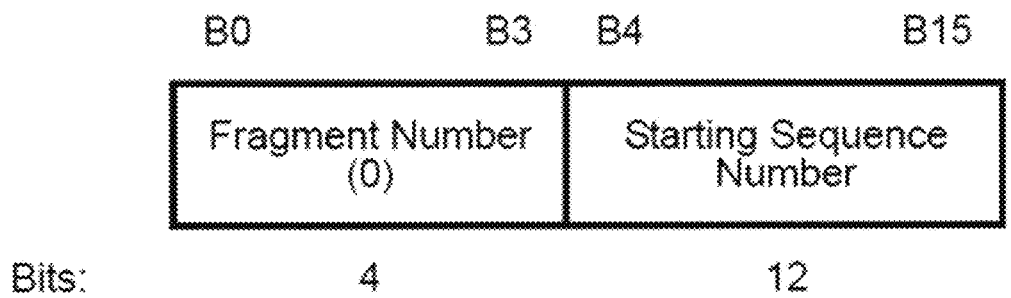
FIG. 7 is a diagram illustrating a configuration of a Block Ack Start Sequence Control subfield.

FIG. 6 is a diagram illustrating a detailed configuration of the BA Information field in FIG. 4 and FIG. 7 is a diagram illustrating a configuration of a Block Ack Start Sequence Control subfield.

As illustrated in FIG. 6, the BA Information field may include a Block Ack Starting Sequence Control (SSC) subfield and a Block Ack Bitmap subfield.

As illustrated in FIG. 6, the Block Ack Bitmap subfield is 128 octets in length and thus may represent a reception status of 64 MAC Service Data Units (MSDUs). If a bit position n of the Block Ack Bitmap subfield is set to 1, this may indicate that an MPDU having an MPDU sequence control value corresponding to (SSC+n) has been successfully received, wherein SSC denotes a value of the Block Ack Starting Sequence Control subfield. In contrast, if the bit position n of the Block Ack Bitmap field is set to 0, this may indicate that the MPDU having the MPDU sequence control value corresponding to (SSC+n) has not been received. Each of values of an MPDU Sequence Control field and the Block Ack Starting Sequence Control subfield may be treated as a 16-bit unsigned integer. For unused fragment numbers of an MSDU, corresponding bits in a bitmap may be set to 0.

Figure 8:
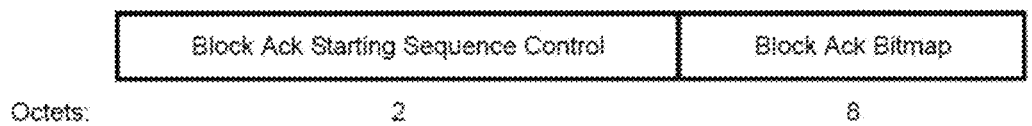
FIG. 8 is a diagram illustrating a configuration of a BS Information field of a compressed BlockAck frame.

FIG. 8 is a diagram illustrating a configuration of a BS Information field of a compressed BlockAck frame.

As illustrated in FIG. 8, a Block Ack Bitmap subfield of the BS Information field of the compressed BlockAck frame may be 8 octets in length and indicate a reception status of 64 MSDUs and A-MSDUs. The first bit of a bitmap corresponds to an MSDU or an A-MSDU matching a value of a Block Ack Starting Sequence Control subfield and respective bits may sequentially correspond to MSDUs or A-MSDUs after the above MSDU or the A-MSDU.

Figure 9:
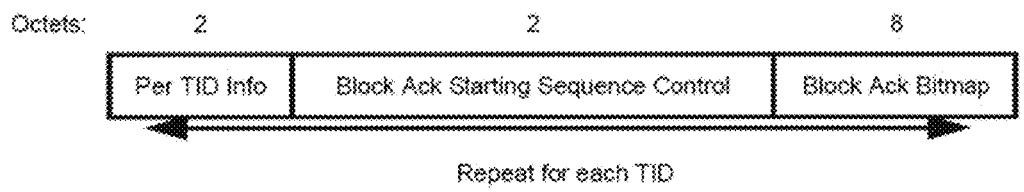
FIG. 9 is a diagram illustrating a BA Information field of a multi-TID BlockAck frame.

FIG. 9 is a diagram illustrating a BA Information field of a multi-TID BlockAck frame.

A TID_INFO subfield of the BA Information field of the multi-TID BlockAck frame contains information about the number of TIDs in the BA Information field. Specifically, a value of the TID_INFO subfield represents (the number of TIDs corresponding to information of the BA Information field)-1. For example, if the value of the TID_INFO subfield is 2, this may indicate that the BA Information field contains information about three TIDs.

Meanwhile, the multi-TID BlockAck frame may include a Per TID Info subfield in addition to a Block Ack Starting Sequence Control subfield and a Block Ack Bitmap subfield as illustrated in FIG. 9. The first emerging Per TID Info, Block Ack Starting Sequence Control, and Block Ack Bitmap subfields may be transmitted in correspondence to the lowest TID value and subsequently repeated subfields may correspond to the next TID. A triplet of these subfields may be repeated per TID.

Figure 10:
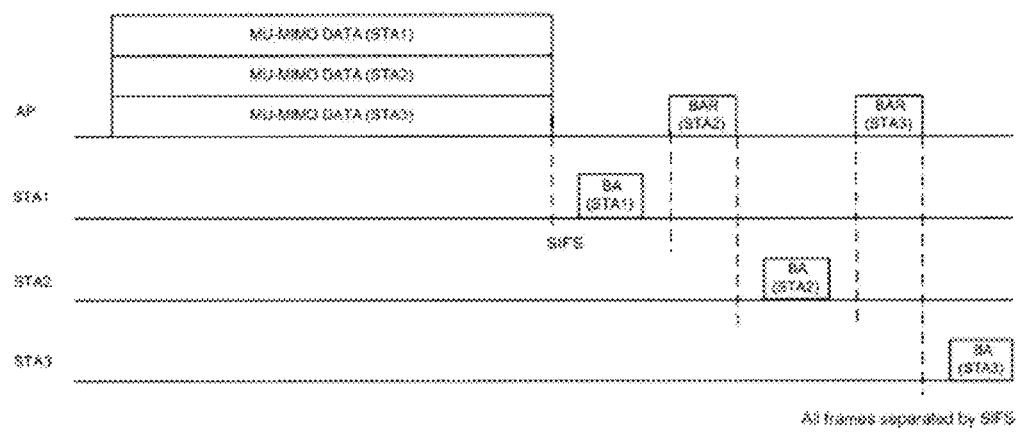
FIGS. 10 and 11 are diagrams for explaining the case in which a block Ack mechanism is applied to a DL MU-MIMO scheme.
Figure 11:
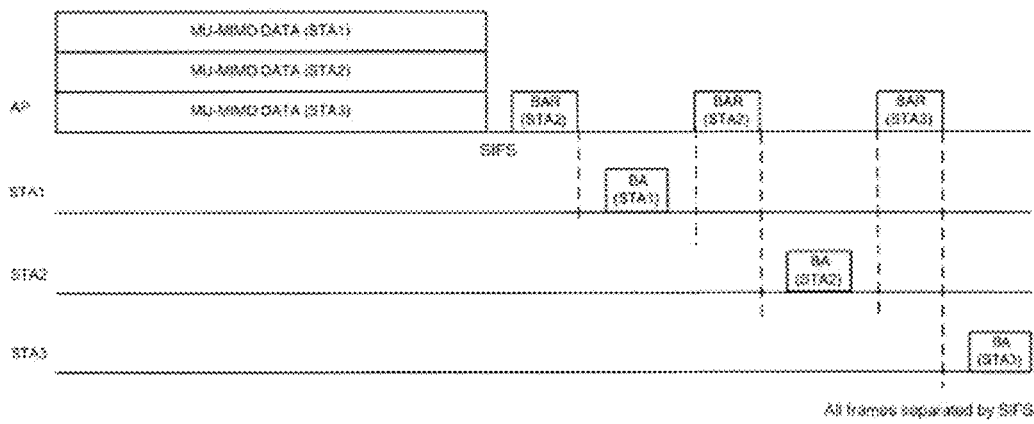

FIGS. 10 and 11 are diagrams for explaining the case in which a block Ack mechanism is applied to a DL MU-MIMO scheme.

As illustrated in FIGS. 10 and 11, an AP may transmit MU-MIMO data frames to a plurality of STAs STA 1 to STA 3.

It is assumed in FIG. 10 that frame exchange is performed after a Short InterFrame Space (SIFS) after an MU PLCP Packet Data Unit (PPDU) is transmitted. It is also assumed in FIG. 10 that for STA1, an implicit block Ack request is configured as Ack policy and, for STA 2 and STA 3, a block Ack is configured as Ack policy. Then, STA 1 may immediately transmit a BA frame after receiving a DL MU PPDU even without receiving a request for the block Ack. In contrast, the AP may perform polling by transmitting a BA request (BAR) frame to STA 2 and STA 3 and then STA 2 and STA 3 may transmit BA frames.

Meanwhile, FIG. 11 illustrates an example of performing a frame exchange without an SIFS after an MU PPDU is transmitted and it is assumed that a block Ack is configured as Ack policy for all STAs. Therefore, the AP may perform polling by transmitting a BAR frame to all STAs.

Figure 12:
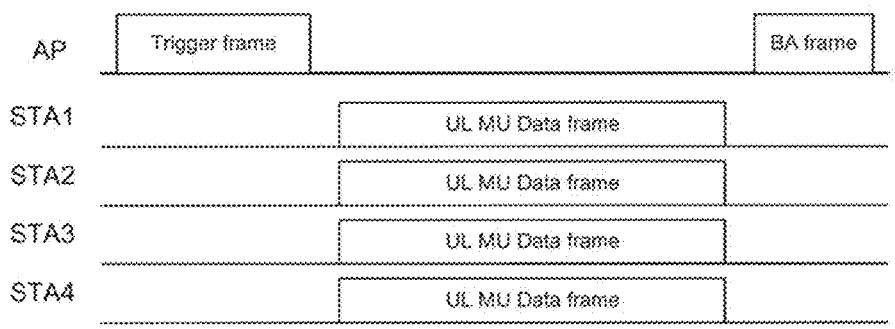
FIG. 12 is a diagram for explaining a UL MU transmission situation to which the present invention is applicable.

FIG. 12 is a diagram for explaining a UL MU transmission situation to which the present invention is applicable.

A UL MU transmission scheme may be used in an 802.11ax system as described above and may be initialized when an AP transmits a trigger frame to a plurality of STAs (e.g., STA 1 to STA 4) as illustrated in FIG. 12. The trigger frame may include UL MU allocation information (e.g. resource location and size, STA IDs, an MCS, and an MU type (MIMO, OFDMA, etc.)). Specific examples of information transmitted in the trigger frame may be as follows.

TABLE 3

Duration of a UL MU frame
Number of allocation (N)
Each allocation's Information
SU/MU
AID (for MU, as many AIDs as
the number of STAs are additionally included.)
Power adjustment
Tone(/Resource) allocation information (e.g., bitmap)
MCS
Nsts
STBC
Coding
Beamformed
Etc.

Meanwhile, as illustrated in FIG. 12, the AP may obtain a TXOP for transmitting the trigger frame via a contention procedure in order to access a medium. The STAs may transmit UL data frames with a format indicated by the AP after an SIFS of the trigger frame. It is assumed that the AP according to the present invention transmits an Ack of the UL MU data frames through a BA frame.

However, the above-described BA frame for the UL MU frames considerably increases in size as compared with a BA frame for a UL MU frame, thereby causing a serious overhead problem. For example, the BA frame transmitted by STA 1 in FIGS. 10 and 11 includes BA information about data transmitted by the AP to STA 1, whereas the BA frame transmitted by the AP in FIG. 12 includes BA information about the UL MU data frames transmitted by STA 1 to STA 4. In addition, since the size of a MAC frame corresponds to 32 bytes when a compressed Block Ack is used and 150 bytes when a normal block Ack is used, overhead may be problematic.

Accordingly, exemplary embodiments of the present invention propose a method for efficiently transmitting a BA frame by using a multi-TID block Ack frame format among the above-described BA frames.

Figure 13:
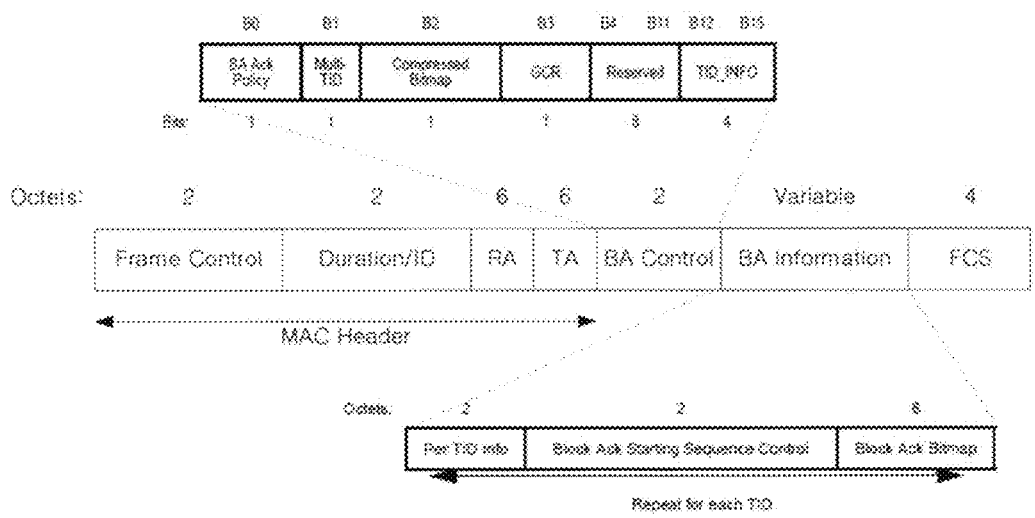
FIG. 13 is a diagram illustrating a frame structure to be used for a DL MU block Ack mechanism according to an exemplary embodiment of the present invention.

FIG. 13 is a diagram illustrating a frame structure to be used for a DL MU block Ack mechanism according to an exemplary embodiment of the present invention.

A multi-STA BA frame to be used according to an embodiment of the present invention may basically have a multi-TID BA frame as illustrated in FIG. 13 and may desirably include an indicator indicating that a corresponding BA frame is not a simple multi-TID BA frame but a multi-STA BA frame. Accordingly, a BA Information field may include BA information about different STAs as opposed to a conventional field.

Figure 14:
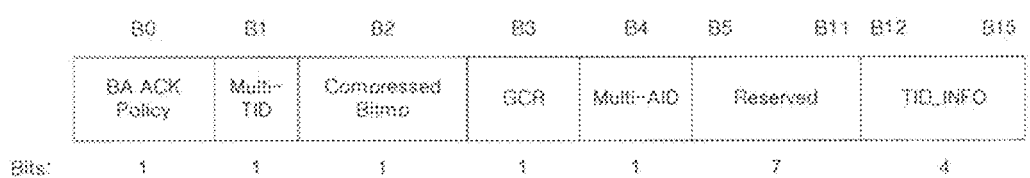
FIG. 14 is a diagram illustrating an exemplary changed configuration of a BA Control field in FIG. 13.

FIG. 14 is a diagram illustrating an exemplary changed configuration of a BA Control field in FIG. 13.

A BA Control field illustrated in FIG. 14 further includes a Multi-AID field as compared with the BA Control field in FIG. 13. The Multi-AID field may serve as an indicator indicating that the Multi-TID BA frame is a BA frame for a plurality of STAs as described above and include other additional information for a plurality of AIDs.

In this way, if the BA frame for multiple STAs is configured, it is desirable to include (partial) AID information for each STA. A Per TID Info field or a field corresponding to the Per TID Info field may be used for the AID information.

Figure 15:
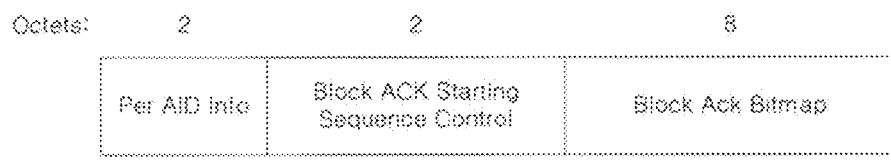
FIG. 15 is a diagram illustrating an example of using a BA Information field of FIG. 13 when a BA frame is used as a multi-STA BA frame.

FIG. 15 is a diagram illustrating an example of using a BA Information field of FIG. 13 when a BA frame is used as a multi-STA BA frame.

A Block Ack Starting Sequence Control subfield and a Block Ack Bitmap subfield illustrated in FIG. 15 may perform similar functions to those described above. Notably, in FIG. 15, a Per TID Info field is used as a Per AID Info field and includes the Block Ack Starting Sequence Control subfield and the Block Ack Bitmap subfield per AID.

This configuration may be used when a Multi-AID field illustrated in FIG. 14 is set to a specific value (e.g., 1) to indicate that the BA frame is a Multi-STA BA frame.

Figure 16:
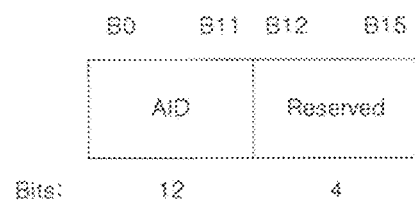
FIG. 16 is a diagram illustrating a configuration of a Per AID Info field in FIG. 15.

FIG. 16 is a diagram illustrating a configuration of a Per AID Info field in FIG. 15.

The Per AID Info field may use a predetermined length to indicate AIDs of a plurality of STAS as illustrated in FIG. 16. Although the size of AID information is expressed as 12 bits in FIG. 16, it will be apparent to those skilled in the art that the size of the AID field may be defined as bits smaller than 12 bits when an abbreviated AID such as a PAID is used.

Meanwhile, an exemplary embodiment of the present invention proposes that BA indicator information indicating whether the Block Ack Starting Sequence Control subfield and/or the Block Ack Bitmap subfield may be omitted be additionally included in the Per TID Info field (or the Per AID Info field as illustrated in FIGS. 15 and 16) of the Multi-TID frame in order to efficiently solve an overhead problem that may occur in using the Multi-STA BA frame as described above.

For example, if an AP has successfully received all MPDUs/Aggregated MPDUs (A-MPDUs) transmitted through a UL MU PPDU from a specific STA, the Block Ack Starting Sequence Control field and the Block Ack Bitmap field may not be needed. As another example, if the AP has successfully received all MPDUs/A-MPDUs starting from a specific MPDU/A-MPDU among a plurality of MPDUs/A-MPDUs transmitted through a UL MU PPDU from a specific STA, Block Ack starting sequence information is needed but Block Ack bitmap information may not be needed. Accordingly, in these situations, if 'BA indicator information' is additionally contained after AID information of the Per TID Info field (or the Per AID Info field) and then transmitted, overhead caused by the Block Ack Starting Sequence Control subfield and/or the Block Ack Bitmap subfield in the case in which the Block Ack Starting Sequence Control subfield and/or the Block Ack Bitmap subfield are not needed can be reduced.

Figure 17:
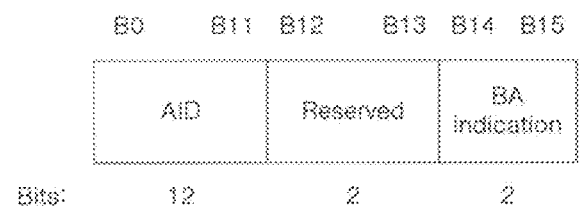
FIG. 17 illustrates the case in which BA indicator information is added after an AID field and a Reserved field.

FIG. 17 illustrates the case in which BA indicator information is added after an AID field and a Reserved field. However, it is apparent that the BA indicator information is located immediately after the AID information.

A specific embodiment of the present invention proposes that the BA indicator information be configured by 2 bits representing the following information.

(1) 00: Normal BA information. This indicates that both the Block Ack Starting Sequence Control field and the Block Ack Bitmap field are included as illustrated in FIG. 15.

Figure 18:
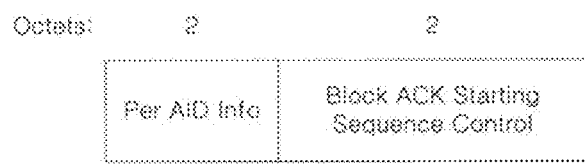
FIGS. 18 and 19 are diagrams illustrating the case in which a Block ACK Starting Sequence Control field and/or a Block ACK bitmap field is omitted according to an embodiment of the present invention.

(2) 01: Partial BA information. This indicates that all remaining MSDUs/A-MSDUs (or MPDUs/A-MPDUs) starting from an MSDU/A-MSDU (or MPDU/A-MPDU) indicated by the Block Ack Starting Sequence Control field have been successfully received. In this case, only the Block ACK Starting Sequence Control field may be included in the BA Information field together with Per AID Info (Per TID Info) and then transmitted as illustrated in FIG. 18.

Figure 19:
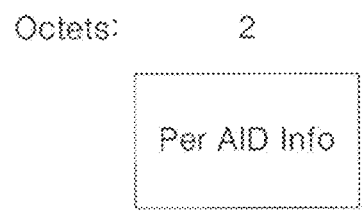

(3) 10: This indicates that a corresponding MPDU has been successfully received and represents ACK when a received PPDU is a single MPDU. This also indicates that all MPDUs included in a PPDU have been successfully received when the received PPDU includes a plurality of MPDUs. In this case, only the Per AID Info field (as another name, Per TID Info field) may be included in the BA Information field without including the Block ACK Starting Sequence Control field and the Block ACK bitmap as illustrated in FIG. 19.

(4) 11: Reserved

In the above description, the BA indication value is purely exemplary and other values may be set as the BA indication value.

Figure 20:
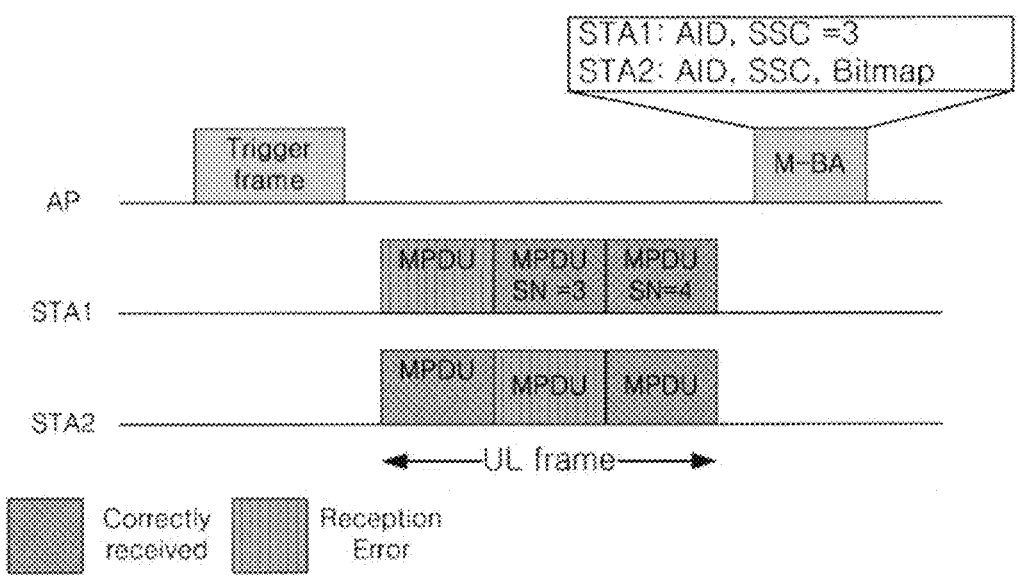
FIGS. 20 to 22 are diagrams for explaining a multi-STA block Ack mechanism using a BA indicator.
Figure 21:
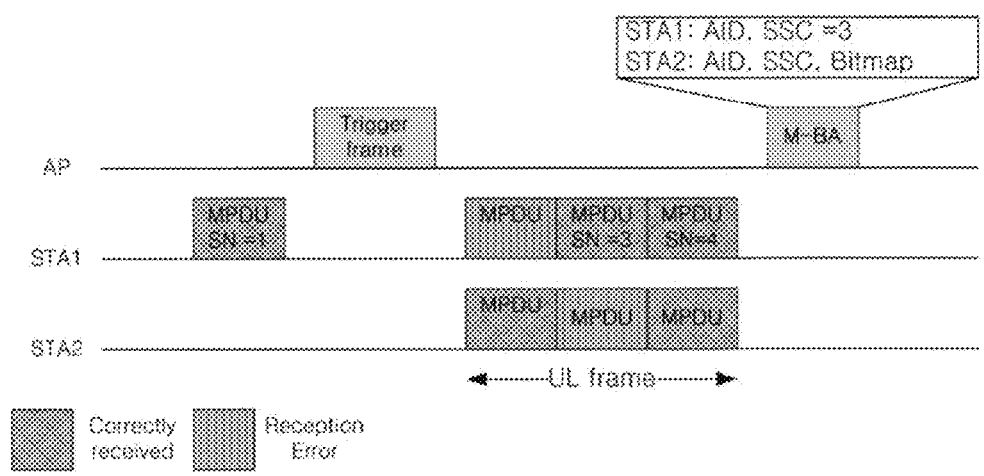
Figure 22:
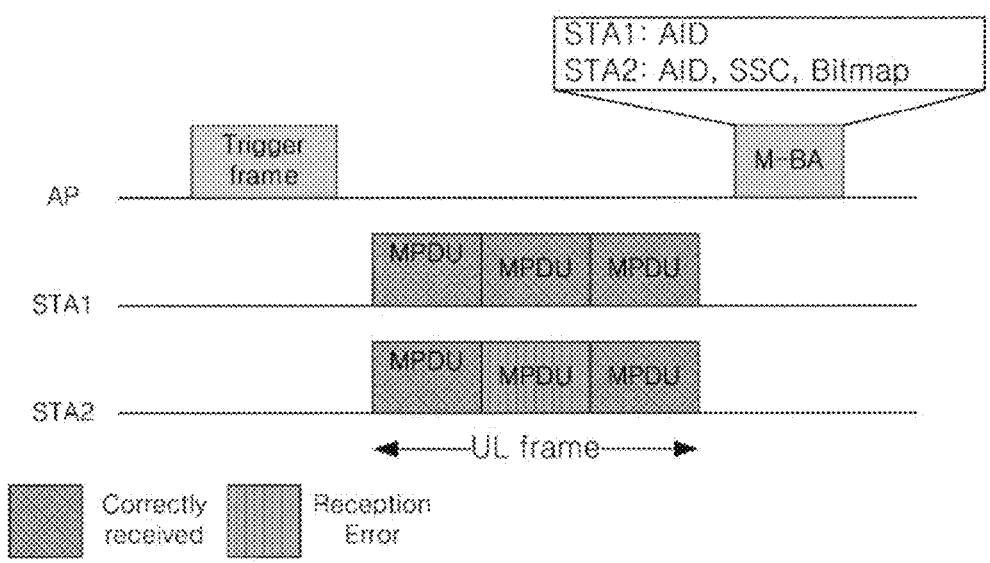

FIGS. 20 to 22 are diagrams for explaining a multi-STA block Ack mechanism using the above-described BA indicator.

In FIG. 20, an AP may transmit a trigger frame for UL MU transmission to a plurality of STAs (e.g., STA 1 and STA 2). STA 1 and STA 2 may transmit PPDUs each including a plurality of MPDUs in response to the trigger frame.

If the AP has successfully received all MPDUs after an MPDU corresponding to sequence number 3 among a plurality of MPDUs received from STA 1, the AP may omit a block Ack bitmap for STA 1 and configure and transmit a BA Information field including a Block Ack Starting Sequence Control subfield corresponding to SSC=3 and AID information. In this case, according to the above-described BA indicator regulation, the BA indicator may indicate a value 01.

Meanwhile, if there is an MPDU that has been successfully received before an MPDU that the AP has failed to receive among a plurality of MPDUs received from STA 2 as illustrated in FIG. 20, the block Ack bitmap cannot be omitted as opposed to STA 1 and may transmit the AID information, the Block Ack Starting Sequence Control subfield, and the block Ack bitmap to STA 2. In this case, according to the above-described BA indicator regulation, the BA indicator may indicate a value 00.

Meanwhile, FIG. 21 illustrates the case in which there is a successfully received MPDU from STA1 before the trigger frame is received as opposed to FIG. 20.

Even when all MPDUs transmitted after a specific MPDU, including a previous PPDU as well as a current PPDU, have been successfully received, only an SSC (Starting Sequence Control subfield) may be transmitted. This indicates that all MPDUs starting from an MPDU indicated by a sequence number of the SSC have been successfully received. That is, FIG. 21 shows that MPDUs starting from an MPDU corresponding to SSC=3 of STA 1 have been successfully received.

FIG. 22 illustrates the case in which all MPDUs received from STA 1 have been successfully received. In this case, according to the above-described BA indicator regulation, the BA indicator value is set to 10 and a BA Information field may be transmitted by omitting both the SCC and the bitmap.

Figure 23:
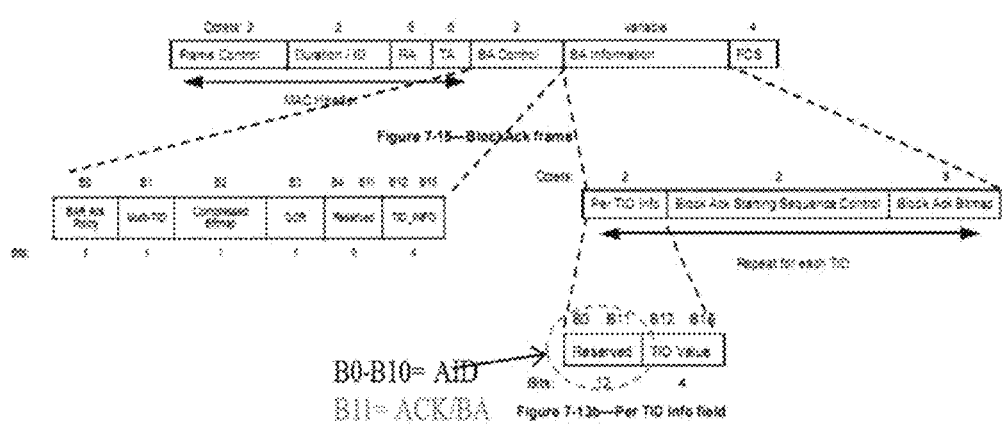
FIG. 23 is a diagram illustrating a multi-STA BA frame format according to another embodiment of the present invention.

FIG. 23 is a diagram illustrating a multi-STA BA frame format according to another embodiment of the present invention.

In FIG. 23, AID information and the above-described BA indicator information are transmitted using 12 reserved bits of a Per TID Info field of a BA Information field. It is noted in FIG. 23 that the BA indicator information indicates ACK/BA using one bit. Specifically, the first bit B0 to the eleventh bit B10 of the Per TID Info field indicate AID information and the twelfth bit B11 indicates that ACK/BA information representing whether a Block Ack Starting Sequence Control subfield and a Block Ack Bitmap subfield are omitted in a BA Information field for a corresponding TID (AID) is included.

If B11 of the Per TID Info field is set, this may indicate that the Block Ack Bitmap and Block Ack Starting Sequence Control subfields are omitted in the BA Information field. In this case, the BA Information field may indicate that all MPDUs (in the case of a single MPDU, a corresponding single MPDU) received through a PPDU from an STA of a corresponding AID have been successfully received.

That is, in the embodiment of FIG. 23, only All Ack indication among BA indicator values is expressed by 1-bit information. However, an indicator for the case in which only an SCC is included may be regulated in an additional field and various other combinations may be applied according to the structure of a corresponding frame.

The Block ACK Starting Sequence Control field may indicate that all MPDUs starting from an MPDU indicated by a specific sequence number have been received or a specific bit or a specific value in a TID Value field may indicate that there is no block Ack bitmap. In this case, an ACK/BA indication bit of the Per TID Info field may indicate BA.

Meanwhile, a specific bit/field of the Block ACK Starting Sequence Control field or a specific value of a specific field may indicate whether a block Ack bitmap is present. For example, in the Block Ack Starting Sequence Control field, a specific value of a Fragment Number field or specific bits (M LSB bits (where M=2 or 3)) of the Fragment Number field may indicate block ACK bitmap length and a specific value (e.g., all 1 or all 0) may indicate that there is no block Ack bitmap.

Figure 24:
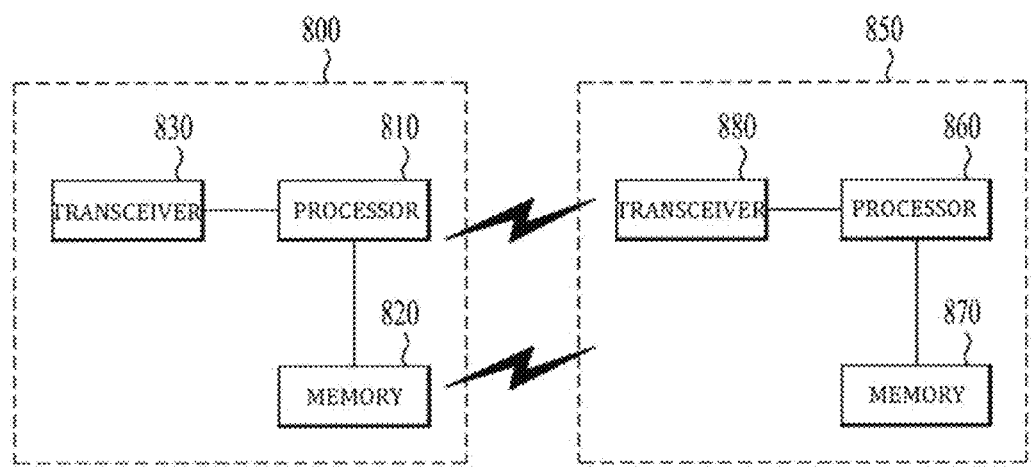
FIG. 24 is a diagram for explaining an apparatus for implementing a method according to the present invention.

FIG. 24 is a diagram for explaining an apparatus for implementing the above-described method.

A wireless apparatus 800 of FIG. 24 may correspond to the above-described STA and a wireless apparatus 850 of FIG. 24 may correspond to the above-described AP.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have been described in the context of an IEEE 802.11 based WLAN system, the present invention is not applied thereto. The present invention is identically applicable to various WLAN systems in which an AP can perform a block Ack mechanism for a plurality of STAs.

What is claimed is:

1. A method for an Access Point (AP) to transmit a Block Acknowledgement (BA) signal for transmission data from a plurality of Stations (STAs) in a Wireless Local Area Network (WLAN) system, the method comprising:
   receiving the transmission data from the plurality of STAs; and
   transmitting a multi-STA BA frame for the transmission data received from the plurality of STAs,
   wherein the multi-STA BA frame includes a Media Access Control (MAC) header field, a BA control field, and a BA information field,
   wherein the BA information field includes an individual information field including:
      Association Identifier (AID) information for one or more STAs, to which ACK/Negative ACK is directed, among the plurality of STAs, and
      BA indicator information indicating whether the BA information field includes one or more of a block ACK bitmap subfield and a starting sequence control subfield, and
   wherein the BA information field does not include the block ACK bitmap subfield and the starting sequence control subfield, and the BA information field indicates ACK for all MAC Protocol Data Units (MPDUs) received by the transmission data, when the BA indicator information of the individual information field indicates a first value.

2. The method according to claim 1, wherein the BA information field includes the starting sequence control subfield and does not include the block ACK bitmap subfield, when the BA indicator information of the individual information field indicates a second value.

3. The method according to claim 2, wherein the BA information field indicates ACK for all MPDUs from or after an MPDU corresponding to the starting sequence control subfield among a plurality of MPDUs in a PPDU received from an STA having an AID included in the AID information, when the BA indicator information of the individual information field indicates the second value.

4. The method according to claim 1, wherein the BA Information field includes both the block ACK bitmap subfield and the starting sequence control subfield, when the BA indicator information of the individual information field indicates a third value.

5. The method according to claim 1, wherein the multi-STA BA frame has a multi-Traffic Identifier (TID) block Ack frame format including a multi-TID subfield in the BA control field.

6. The method according to claim 1, wherein the BA information field includes a plurality of BA information fields and each of the plurality of BA Information fields indicates ACK for different STAs.

7. The method according to claim 1, wherein the individual information field has a length of 12 bits in which a first bit, B0, to an 11th bit, B10, indicate the AID information and the 12th bit, B11, indicates the BA indicator information.

8. The method according to claim 1, wherein the individual information field is a per TID Information field.

9. The method according to claim 1, wherein the data received from the plurality of STAs has an uplink Multi-User (MU) PPDU format and a PPDU received from a specific STA includes a single MPDU or a plurality of MPDUs.

10. The method according to claim 9, wherein the uplink MU PPDU received from the plurality of STAs is received in response to a transmission of a trigger frame from the AP to the plurality of STAs.

11. A method for receiving a Block Acknowledgement (BA) signal from an Access Point (AP) by a Station (STA) in a Wireless Local Area Network (WLAN) system, the method comprising:
    transmitting data to the AP; and
    receiving an ACK signal for the data through a multi-STA BA frame from the AP,
    wherein the multi-STA BA frame includes a Media Access Control (MAC) header field, a BA control field, and a BA information field,
    wherein the BA information field includes an individual information field including:
        Association Identifier (AID) information for one or more STAs to which ACK/Negative ACK is directed among the plurality of STAs, and
        BA indicator information indicating whether the BA information field includes one or more of a block ACK bitmap subfield and a starting sequence control subfield, and
    wherein the BA information field does not include the block ACK bitmap subfield and the starting sequence control subfield, and the BA information field indicates ACK for all MAC Protocol Data Units (MPDUs) transmitted by the data, when the BA indicator information of the individual information field indicates a first value.

12. An Access Point (AP) for transmitting a Block Acknowledgement (BA) signal for transmission data of a plurality of Stations (STAs) in a Wireless Local Area Network (WLAN) system, the AP comprising:
    a transceiver configured to receive the transmission data from the plurality of STAs and to transmit a multi-STA BA frame for the transmission data received from the plurality of STAs; and
    a processor connected to the transceiver and configured to process the transmission data and to generate the multi-STA BA frame,
    wherein the processor is configured to generate the multi-STA BA frame to include a Media Access Control (MAC) header field, a BA control field, and a BA information field,
    wherein the BA information field includes an individual information field including
        Association Identifier (AID) information for one or more STAs to which ACK/Negative ACK is directed among the plurality of STAs, and
        BA indicator information indicating whether the BA Information field includes one or more of a block ACK bitmap subfield and a starting sequence control subfield, and
    wherein the processor does not include the block ACK bitmap subfield and the starting sequence control subfield in the BA information field, and the BA information field indicates ACK for all MAC Protocol Data Units (MPDUs) received by the transmission data, when the BA indicator information of the individual information field indicates a first value.

13. A Station (STA) for receiving a Block Acknowledgement (BA) signal from an Access Point (AP) in a Wireless Local Area Network (WLAN) system, the STA comprising:
    a transceiver configured to transmit data to the AP and to receive an ACK signal for the data through a multi-STA BA frame from the AP; and
    a processor connected to the transceiver and configured to prepare the data and to process the multi-STA BA frame,
    wherein the multi-STA BA frame includes a Media Access Control (MAC) header field, a BA control field, and a BA information field,
    wherein the BA information field includes an individual information field including:
        Association Identifier (AID) information for one or more STAs to which ACK/Negative ACK is directed among the plurality of STAs, and
        BA indicator information indicating whether the BA information field includes one or more of a block ACK bitmap subfield and a starting sequence control subfield, and
    wherein the BA information field does not include the block ACK bitmap subfield and the starting sequence control subfield, and the BA information field indicates ACK for all MAC Protocol Data Units (MPDUs) transmitted by the data, when the BA indicator information of the individual information field indicates a first value.

* * * * *